US007034897B2

(12) United States Patent
Alvarez et al.

(10) Patent No.: US 7,034,897 B2
(45) Date of Patent: Apr. 25, 2006

(54) METHOD OF OPERATING A VIDEO DECODING SYSTEM

(75) Inventors: Jose' R. Alvarez, Sunnyvale, CA (US); Alexander G. MacInnis, Los Altos, CA (US); Sheng Zhong, Fremont, CA (US); Xiaodong Xie, Fremont, CA (US); Vivian Hsiun, Yorba Linda, CA (US)

(73) Assignee: Broadcom Corporation, Irvine, CA (US)

( * ) Notice: Subject to any disclaimer, the term of this patent is extended or adjusted under 35 U.S.C. 154(b) by 565 days.

(21) Appl. No.: 10/114,679

(22) Filed: Apr. 1, 2002

(65) Prior Publication Data

US 2003/0185298 A1    Oct. 2, 2003

(51) Int. Cl.
*H04N 7/18* (2006.01)
(52) U.S. Cl. ...................................... 348/721; 348/719
(58) Field of Classification Search ........................ 375/ 240.01–240.29; 348/700–730
See application file for complete search history.

(56) References Cited

U.S. PATENT DOCUMENTS

| 5,379,356 | A | * | 1/1995 | Purcell et al. ............... 382/233 |
| 5,576,765 | A | * | 11/1996 | Cheney et al. .......... 375/240.02 |
| 5,579,052 | A | * | 11/1996 | Artieri .................... 375/240.15 |
| 5,589,885 | A | * | 12/1996 | Ooi ......................... 375/240.03 |
| 5,598,483 | A | * | 1/1997 | Purcell et al. ............... 382/232 |
| 5,646,687 | A | * | 7/1997 | Botsford et al. ........ 375/240.12 |
| 5,774,676 | A | * | 6/1998 | Stearns et al. ............... 709/247 |
| 5,815,646 | A | * | 9/1998 | Purcell et al. ............... 345/502 |
| 5,818,532 | A | * | 10/1998 | Malladi et al. ......... 375/240.03 |
| 6,538,656 | B1 |  | 3/2003 | Cheung et al. ............. 345/519 |
| 6,630,964 | B1 | * | 10/2003 | Burns et al. ................. 348/554 |

OTHER PUBLICATIONS

U.S. Appl. No.: 09/437,208 entitled "Graphics Display System", filed Nov. 9, 1999, Inventor: Alexander G. MacInnis et al.
U.S. Appl No.: 09/641,374 entitled "Video, Audio And Graphics Decode, Composite And Display System", filed Aug. 18, 2000, Inventor: Alexander G. MacInnis et al.
U.S. Appl. No.: 09/641,936 entitled "Video And Graphics System With An MPEG Video Decoder For Concurrent Multi-Row Decoding", filed Aug. 18, 2000, Inventor: Ramanujan K. Valmiki et al.

(Continued)

*Primary Examiner*—Andy Rao
(74) *Attorney, Agent, or Firm*—McAndrews, Held & Malloy, Ltd.

(57) ABSTRACT

A system and method for decoding a digital video data stream. In one aspect, a plurality of hardware acceleration modules are used together with a core processor. The accelerators operate in a decoding pipeline wherein, in any given stage, each accelerator operates on a particular macroblock of video data. In the subsequent pipeline stage, each accelerator works on the next macroblock in the data stream, which was worked on by another one of the accelerators in the previous stage. The core processor polls all of the accelerators during each stage. When all accelerators finish their tasks for a given stage, the core processor initiates the next stage. In another aspect, two variable-length decoders are employed to simultaneously decode two macroblock rows of a video frame. Each variable-length decoder works to decode an assigned row and the rows are variable-length decoded in parallel. The variable-length decoders operate as part of a pipeline wherein the variable-length decoders alternate, stage-by-stage, decoding macroblocks.

68 Claims, 11 Drawing Sheets

OTHER PUBLICATIONS

U.S. Appl. No.: 09/643,223 entitled "Video And Graphics System With MPEG Specific Data Transfer Commands", filed Aug. 18, 2000, Inventor: Ramanujan K. Valmiki et al.

U.S. Appl. No.: 09/640,670 entitled "Video And Graphics System With Video Scaling", filed Aug. 18, 2000, Inventor: Alexander G. MacInnis et al.

U.S. Appl. No.: 09/641,930 entitled "Video And Graphics System With A Video Transport Processor", filed Aug. 18, 2000, Inventor: Ramanujan K. Valmiki et al.

U.S. Appl. No.: 09/641,935 entitled "Video And Graphics System With Parallel Processing Of Graphics Windows", filed Aug. 18, 2000, Inventor: Alexander G. MacInnis et al.

U.S. Appl. No.: 09/642,510 entitled "Video And Graphics System With A Single-Port RAM", filed Aug. 18, 2000, Inventor: Xiaodong Xie.

U.S. Appl. No.: 09/642,458 entitled "Video And Graphics System With An Integrated System Bridge Controller", Inventor: Alexander G. MacInnis et al.

Pirsch et al: "VLSI Architectures for Video Compression-A Survey", Proceedings of the IEEE, IEEE, New York, NY, USA, vol. 83 No. 2, Feb. 1, 1995, pp 220-246, XP000501242, ISBN: 0018-9219.

* cited by examiner

| | Stage 1 | Stage 2 | Stage 3 | Stage 4 | Stage 5 | Stage 6 | Stage 7 | Stage 8 |
|---|---|---|---|---|---|---|---|---|
| 1100 Core Proc. | (0,0) | (1,0) | (0,1) | (1,1) | (0,2) | (1,2) | (0,3) | (1,3) |
| 1102 VLD0 | (0,0) | (0,0) | (0,1) | (0,1) | (0,2) | (0,2) | (0,3) | (0,3) |
| 1104 VLD1 | | (1,0) | (1,0) | (1,1) | (1,1) | (1,2) | (1,2) | (1,3) |
| 1106 IQ | | | (0,0) | (1,0) | (0,1) | (1,1) | (0,2) | (1,2) |
| 1108 IDCT | | | | (0,0) | (1,0) | (0,1) | (1,1) | (0,2) |
| 1110 PF_REF | | | (0,0) | (1,0) | (0,1) | (1,1) | (0,2) | (1,2) |
| 1112 PF_REC | | | | (0,0) | (1,0) | (0,1) | (1,1) | (0,2) |
| 1114 MC | | | | | (0,0) | (1,0) | (0,1) | (1,1) |
| 1116 DMA | | | | | | (0,0) | (1,0) | (0,1) |

FIG. 11

METHOD OF OPERATING A VIDEO DECODING SYSTEM

INCORPORATION BY REFERENCE OF RELATED APPLICATIONS

The following U.S. patent applications are related to the present application and are hereby specifically incorporated by reference: patent application Ser. No. 10/114,798, entitled "VIDEO DECODING SYSTEM SUPPORTING MULTIPLE STANDARDS"; patent application Ser. No. 10/114,797, entitled "METHOD OF COMMUNICATING BETWEEN MODULES IN A DECODING SYSTEM"; patent application Ser. No.10/114,886, entitled "MEMORY SYSTEM FOR VIDEO DECODING SYSTEM" patent application Ser. No. 10/114,619, entitled "INVERSE DISCRETE COSINE TRANSFORM SUPPORTING MULTIPLE DECODING PROCESSES"; and patent application Ser. No. 10/113,094, now U.S. Pat. No. 6,944,746, entitled "RISC PROCESSOR SUPPORTING ONE OR MORE UNINTERRUPTIBLE CO-PROCESSORS"; all filed on even date herewith. The following Provisional U.S. Patent Applications are also related to the present application and are hereby specifically incorporated by reference: Provisional Patent Application No. 60/369,144, filed Apr. 1, 2002 entitled "VIDEO DECODING SYSTEM HAVING A PROGRAMMABLE VARIABLE LENGTH DECODER"; Provisional Patent Application No. 60/369,014, Apr. 1, 2002 entitled "PROGRAMMABLE VARIABLE LENGTH DECODER"; Provisional Patent Application No. 60/369,210, filed Apr. 1, 2002 entitled "DMA ENGINE HAVING MULTI-LEVEL COMMAND STRUCTURE"; and Provisional Patent Application No. 60/369,217, filed Apr. 1, 2002 entitled "INVERSE QUANTIZER SUPPORTING MULTIPLE DECODING PROCESSES"; all filed on even date herewith.

FIELD OF THE INVENTION

The present invention relates generally to video decoding systems, and more particularly to the timing of various decoding functions.

BACKGROUND OF THE INVENTION

Digital video decoders decode compressed digital data that represent video images in order to reconstruct the video images. A relatively wide variety of encoding/decoding algorithms and encoding/decoding standards presently exist, and many additional algorithms and standards are sure to be developed in the future. The various algorithms and standards produce compressed video bitstreams of a variety of formats. Some existing public format standards include MPEG-1, MPEG-2 (SD/HD), MPEG-4, H.263, H.263+ and H.26L. Also, private standards have been developed by Microsoft Corporation (Windows Media), RealNetworks, Inc., Apple Computer, Inc. (QuickTime), and others. It would be desirable to have a multi-format decoding system that can accommodate a variety of encoded bitstream formats, including existing and future standards, and to do so in a cost-effective manner.

A highly optimized hardware architecture can be created to address a specific video decoding standard, but this kind of solution is typically limited to a single format. On the other hand, a fully software based solution is capable of handling any encoding format, but at the expense of performance. Currently the latter case is solved in the industry by the use of general-purpose processors running on personal computers. Sometimes the general-purpose processor is accompanied by very digital signal processor (DSP) oriented acceleration modules, like multiply-accumulate (MAC), that are intimately tied to the particular internal processor architecture. For example, in one existing implementation, an Intel Pentium processor is used in conjunction with an MMX acceleration module. Such a solution is limited in performance and does not lend itself to creating mass market, commercially attractive systems.

Others in the industry have addressed the problem of accommodating different encoding/decoding algorithms by designing special purpose DSPs in a variety of architectures. Some companies have implemented Very Long Instruction Word (VLIW) architectures more suitable to video processing and able to process several instructions in parallel. In these cases, the processors are difficult to program when compared to a general-purpose processor. In special cases, where the processors are dedicated for decoding compressed video, special processing accelerators are tightly coupled to the instruction pipeline and are part of the core of the main processor.

Yet others in the industry have addressed the problem of accommodating different encoding/decoding algorithms by simply providing multiple instances of hardware dedicated to a single algorithm. This solution is inefficient and is not cost-effective.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a method of decoding an encoded digital data stream. Pursuant to the method, a first stage is executed in which a first decoding function is performed on an $n^{th}$ data element of the data stream and a second decoding function is simultaneously performed on an $n+1^{st}$ data element of the data stream. When the first function is completed with respect to the $n^{th}$ data element and the second function is completed with respect to the $n+1^{st}$ data element, a second stage is executed in which the first decoding function is performed on the $n+1^{st}$ data element and the second decoding function is simultaneously performed on an $n+2^{nd}$ element in the data stream.

Another aspect of the present invention is directed to another method of decoding a digital video data stream. Pursuant to this method, in a first stage, variable-length decoding is performed on an $n^{th}$ data element of the data stream. In a second stage, inverse quantization is performed on a product of the variable-length decoding of the $n^{th}$ data element, while performing variable-length decoding on an $n+1^{st}$ data element in the data stream. The second stage begins when the variable-length decoding of the first stage is completed.

Another embodiment of the present invention is directed to a method of decoding an encoded digital data stream. Pursuant to the method, in a first stage, performance of a first decoding function is initiated on a first data element by a first decoding element. In a second stage, performance of the first decoding function is initiated on a second data element by a second decoding element. In a third stage, a second decoding function is performed on the first data element and performance of the first decoding function is initiated on a third data element by the first decoding element.

Still another aspect of the present invention is directed to a method of decoding an encoded digital video data stream. In a first stage, variable-length decoding is initiated on a first macroblock with a first variable-length decoder. In a second stage, variable-length decoding is initiated on a second macroblock with a second variable-length decoder. In a third stage, inverse quantization is performed on the first macroblock and variable-length decoding is initiated on a third macroblock with the first variable-length decoder.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 11 is a chart representing a dual-row decoding pipeline according to an illustrative embodiment of the present invention.

DETAILED DESCRIPTION

Figure 1:
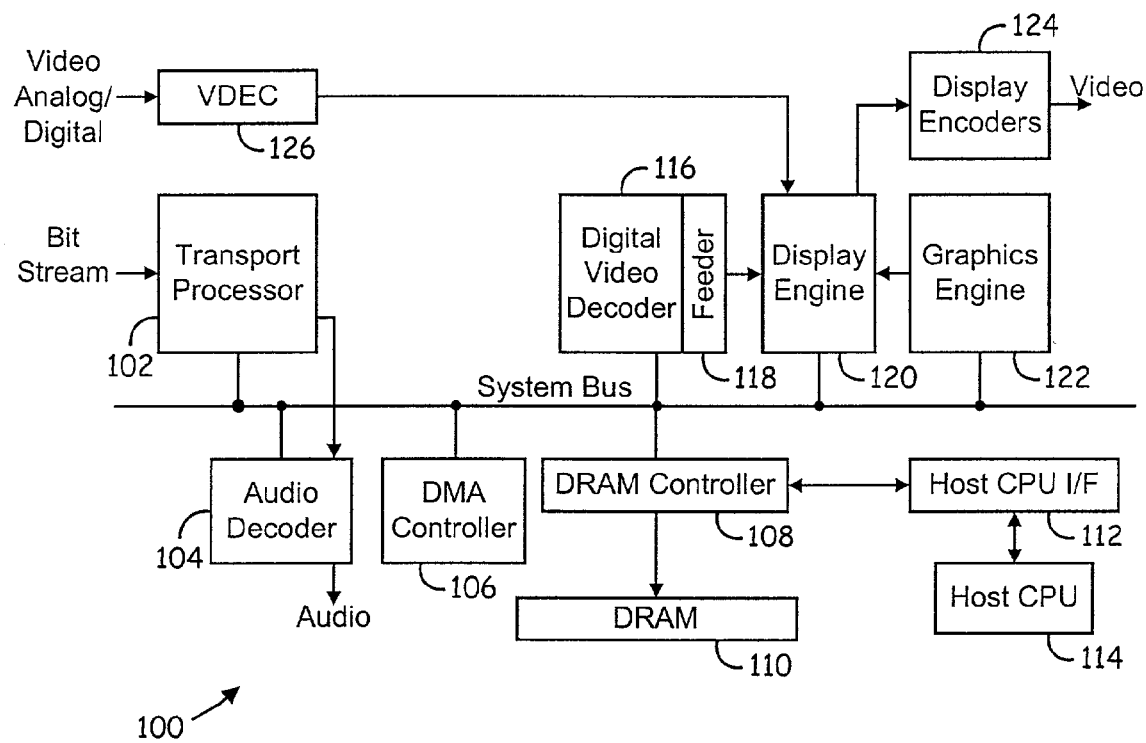
FIG. 1 is a functional block diagram of a digital media system in which the present invention may be illustratively employed.

The present invention forms an integral part of a complete digital media system and provides flexible decoding resources. FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Figure 2:
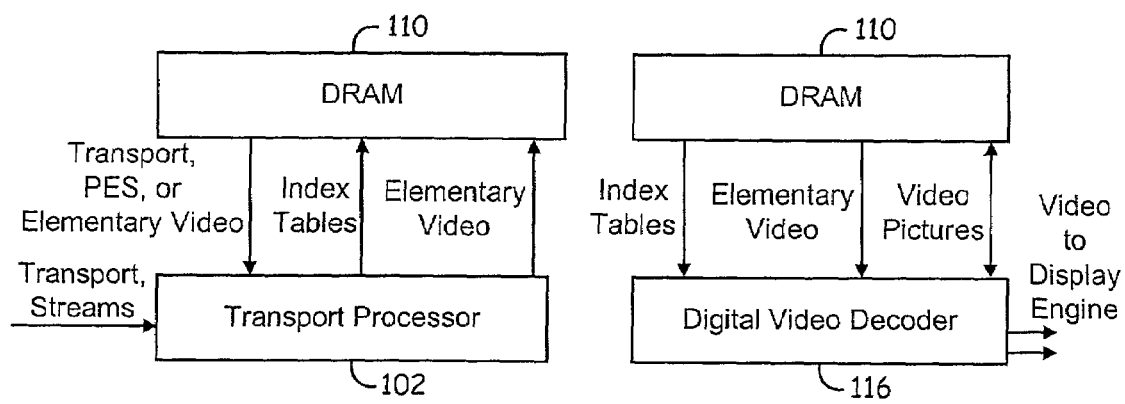
FIG. 2 is a functional block diagram demonstrating a video decode data flow according to an illustrative embodiment of the present invention.

FIG. 2 is a functional block diagram demonstrating a video decode data flow according to an illustrative embodiment of the present invention. Transport streams are parsed by the transport processor 102 and written to main memory 110 along with access index tables. The video decoder 116 retrieves the compressed video data for decoding, and the resulting decoded frames are written back to main memory 110. Decoded frames are accessed by the display feeder interface 118 of the video decoder for proper display by a display unit. In FIG. 2, two video streams are shown flowing to the display engine 120, suggesting that, in an illustrative embodiment, the architecture allows multiple display streams by means of multiple display feeders.

Aspects of the present invention relate to the architecture of digital video decoder 116. In accordance with an exemplary embodiment of the present invention, a moderately capable general purpose CPU with widely available development tools is used to decode a variety of coded streams using hardware accelerators designed as integral parts of the decoding process.

Specifically, the most widely used compressed video formats fall into a general class of DCT-based, variable-length coded, block-motion-compensated compression algorithms. As mentioned above, these types of algorithms encompass a wide class of international, public and private standards, including MPEG-1, MPEG-2 (SD/HD), MPEG-4, H.263, H.263+, H.26L, Microsoft Corp, Real Networks, QuickTime, and others. Fundamental functions exist that are common to most or all of these formats. Such functions include, for example, variable-length decoding (VLD), inverse quantization (IQ), inverse discrete cosine transform (IDCT), pixel filtering (PF), motion compensation (MC), and de-blocking/de-ringing (post-processing). According to the present invention, these functions are accelerated by hardware accelerators.

The decoding system of the present invention employs high-level granularity acceleration with internal programmability to achieve the requirements above by implementation of very fundamental processing structures that can be configured dynamically by the core decoder processor. This contrasts with a system employing fine-granularity acceleration, such as multiply-accumulate (MAC), adders, multipliers, FFT functions, DCT functions, etc. In a fine-granularity acceleration system, the decompression algorithm has to be implemented with firmware that uses individual low-level instructions (like MAC) to implement a high-level function, and each instruction runs on the core processor. In the high-level granularity system of the present invention, the firmware configures, i.e. programs, each hardware accelerator, which in turn represent high-level functions (like motion compensation) that run without intervention from the main core processor. Therefore, each hardware accelerator runs in parallel according to a processing pipeline dictated by the firmware in the core processor. Upon completion of the high-level functions, each accelerator notifies the main core processor, which in turn decides what the next processing pipeline step should be.

The software control consists of a simple pipeline that orchestrates decoding by issuing commands to each hardware accelerator module for each pipeline stage, and a status request mechanism that makes sure that all modules have completed their pipeline tasks before issuing the start of the next pipeline stage.

Figure 3:
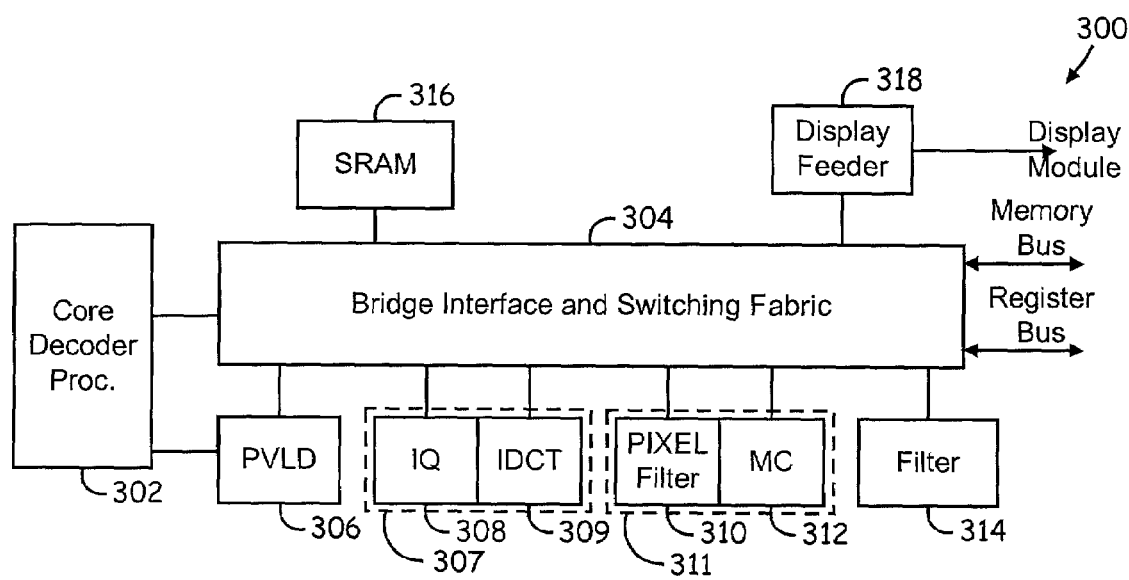
FIG. 3 is a high-level functional block diagram of a digital video decoding system according to an illustrative embodiment of the present invention

FIG. 3 is a high-level functional block diagram of a digital video decoding system 300 according to an illustrative embodiment of the present invention. The digital video decoding system 300 of FIG. 3 can illustratively be employed to implement the digital video decoder 116 of FIGS. 1 and 2. The core processor 302 is the central control unit of the decoding system 300. The core processor 302 prepares the data for decoding. The core processor 302 also orchestrates the macroblock (MB) processing pipeline for all modules and fetches the required data from main memory via the DMA bridge 304. The core processor 302 also handles some data processing tasks. Picture level processing, including sequence headers, GOP headers, picture headers, time stamps, macroblock-level information except the block coefficients, and buffer management, are performed directly and sequentially by the core processor 302, without using the accelerators 304, 306, 308, 309, 310, 312 and 314 other than the VLD 306 (which accelerates general bitstream parsing). Picture level processing does not overlap with slice level/macroblock decoding.

Variable-length decoder (VLD) 306, inverse quantizer 308, inverse transform module 309, pixel filter 310, motion compensation module 312 and loop/post filter 314 are hardware accelerators that accelerate special decoding tasks that would otherwise be bottlenecks for real-time video decoding if these tasks were handled by the core processor 302 alone. In an illustrative embodiment, modules 308 and 309 are implemented in the form of a transform engine 307 that handles all functionality, but which is conceptually equivalent to the union of 308 and 309. In a further illustrative embodiment, modules 310 and 312 are implemented in the form of a filter engine 311 which consists of an internal SIMD (single instruction multiple data) processor and a general purpose controller to interface to the rest of the system, but which is conceptually equivalent to the union of 310 and 312. In a further illustrative embodiment, module 314 is implemented in the form of another filter engine similar to 311 which consists of an internal SIMD (single instruction multiple data) processor and a general purpose controller to interface to the rest of the system, but which is conceptually equivalent to 314. In yet a further illustrative embodiment, module 314 is implemented in the form of the same filter engine 311 that can also implement the equivalent function of the combination of 310 and 311. Each hardware module 306, 308, 309, 310, 312 and 314 performs its task after being so instructed by the core processor 302. In an illustrative embodiment of the present invention, each hardware module includes a status register that indicates whether the module is active or inactive, or which tasks the module has completed. The core processor 302 polls the status register to determine whether the hardware module has completed its task. In an alternative embodiment, the hardware accelerators share a status register.

The VLD engine 306 performs variable-length code (VLD) decoding of the block transform coefficients. It also helps the core processor 302 to decode the header information in the compressed bitstream. In an illustrative embodiment of the present invention, the VLD module 306 is designed as a coprocessor, while the rest of the modules 308, 309, 310, 312 and 314 are designed as hardware accelerators. Also, in an illustrative embodiment, the VLD module 306 includes two variable-length decoders. Each of the two variable-length decoders can be hardwired to efficiently perform decoding according to a particular video compression standard, such as MPEG2 HD. One or both of them can be optionally set as a programmable VLD engine, with a code RAM to hold VLC tables for media coding formats other than MPEG2. The two VLD engines are controlled independently by the core processor 302, and either one or both of them will be employed at any given time, depending on the application.

The IQ engine 308 performs run-level pair decoding, inverse scan and quantization. The inverse transform engine 309 performs IDCT operations or other inverse transform operations like the integer transform of the H.26x standards. In an illustrative embodiment of the present invention, the IQ module 308 and the inverse transform module 309 are part of a common hardware module 307 and use a similar interface to the core processor 302.

The pixel filter 310 performs pixel filtering and interpolation. The motion compensation module 312 performs motion compensation. The pixel filter 310 and motion compensation module 312 are shown as one module 311 in the diagram to emphasize a certain degree of direct cooperation between them. In an illustrative embodiment of the present invention, a common programmable module designated as filter engine 311 is capable of performing internal SIMD instructions to process data in parallel with an internal control processor.

The filter module 314 performs the de-blocking operation common in many low bit-rate coding standards. In one embodiment of the present invention, the filter module comprises a loop filter that performs de-blocking within the decoding loop. In another embodiment, the filter module comprises a post filter that performs de-blocking outside the decoding loop. In yet another embodiment, the filter module 314 includes both a loop filter and a post filter. Furthermore, in yet another embodiment, the filter module 314 is implemented using the same filter engine 311 implementation as for modules 310 and 312, except that module 311 is programmed to produce deblocked or deringed data as the case may be.

The bridge module 304 arbitrates and moves picture data between decoder memory 316 and main memory. The bridge interface 304 includes an internal bus network, or equivalent function, that includes arbiters and a direct memory access (DMA) engine. In an illustrative embodiment, the DMA bridge 304 serves as an asynchronous interface to the system buses.

In an illustrative embodiment of the present invention, the display feeder module 318 reads decoded frames from main memory and manages the horizontal scaling and displaying of picture data. The display feeder 318 interfaces directly to a display module. In an illustrative embodiment, the display feeder 318 includes multiple feeder interfaces, each including its own independent color space converter and horizontal scaler. The display feeder 318 handles its own memory requests via the bridge module 304.

Decoder memory 316 is used to store macroblock data and other time-critical data used during the decode process. Each hardware block 306, 308, 309, 310, 312, 314 accesses decoder memory 316 to either read the data to be processed or write processed data back. In an illustrative embodiment of the present invention, all currently used data is stored either in decoder memory 316, in internal memory of the accelerators (for example, filter module 313) or in the caches of the core processor 302 to minimize access to main memory. Each hardware module 306, 308, 309, 310, 312, 314 is assigned one or more buffers in decoder memory 316 for data processing. Each module accesses the data in decoder memory 316 as the macroblocks are processed through the system. In an exemplary embodiment, decoder memory 316 also includes parameter buffers that are adapted to hold parameters that are needed by the hardware modules to do their job at a later macroblock pipeline stage. The buffer addresses are passed to the hardware modules by the core processor 302. In an illustrative embodiment, decoder memory 316 is a static random access memory (SRAM) unit.

Figure 4:
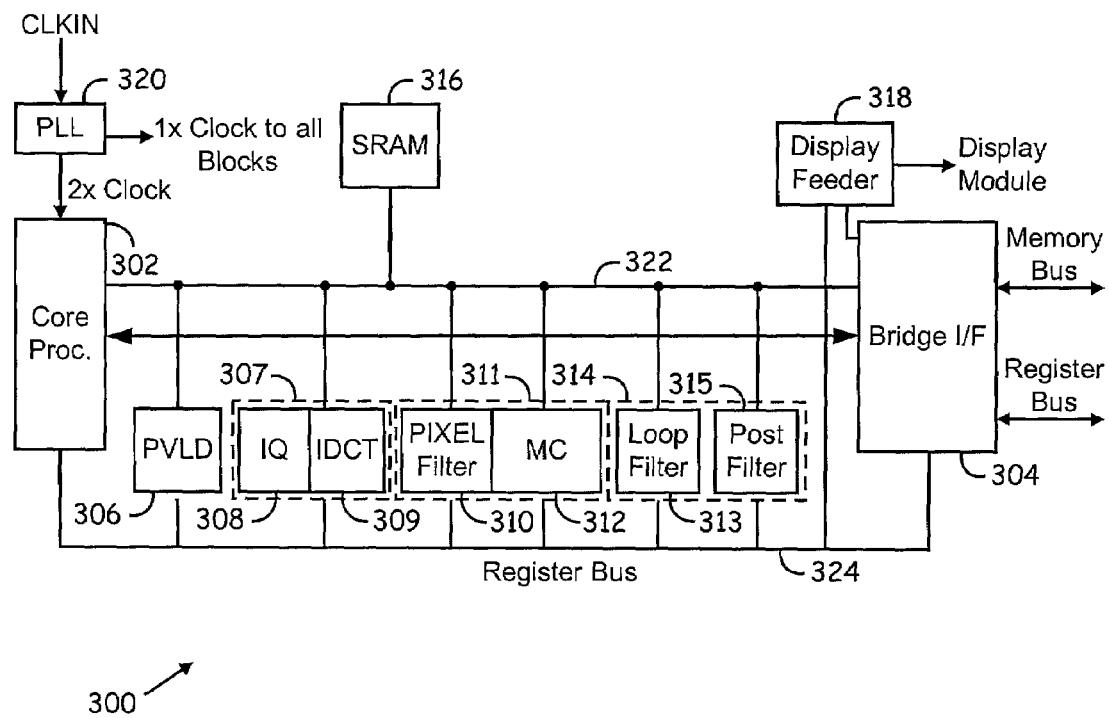
FIG. 4 is a functional block diagram of a digital video decoding system according to an illustrative embodiment of the present invention.

FIG. 4 is a functional block diagram of digital video decoding system 300 according to an illustrative embodiment of the present invention. In FIG. 4, elements that are common to FIG. 3 are given like reference numbers. In FIG. 4, various elements are grouped together to illustrate a particular embodiment where 308 and 309 form part of a transform engine 307, 310 and 312 form part of a filter engine 311 that is a programmable module that implements the functionality of PF and MC, 313 and 315 form part of another filter engine 314 which is another instance of the same programmable module except that it is programmed to implement the functionality of a loop filter 313 and a post filter 315. In addition to the elements shown in FIG. 3, FIG. 4 shows phase-locked loop (PLL) element 320, internal data bus 322, register bus 324 and separate loop and post filters 313 and 315 embodied in a filter engine module 314 which implements the functionality of 313 and 315.

The core processor 302 is the master of the decoding system 300. It controls the data flow of decoding processing. All video decode processing, except where otherwise noted, is performed in the core processor. The VLD 306, IQ 308, inverse transform module 309, PF 310, MC 312 and filter 314 are accelerators to help the core processor achieve the required performance. In an illustrative embodiment of the present invention, the core processor 302 is a MIPS processor, such as a MIPS32 implementation, for example.

At the macroblock level, the core processor 302 interprets the decoded bits for the appropriate headers and decides and coordinates the actions of the hardware blocks 306, 308, 309, 310, 312, 313 and 315. Specifically, all macroblock header information, from the macroblock address increment (MBAinc) to motion vectors (MVs) and to the cbp pattern in the case of MPEG2 decoding, for example, is derived by the core processor 302. The core processor 302 stores related information in a particular format or data structure (determined by the hardware module specifications) in the appropriate buffers in the decoder memory 316. For example, the quantization scale is passed to the buffer for the IQ engine 308; macroblock type, motion type and pixel precision are stored in the parameter buffer for the pixel filter engine 310. The core processor 302 keeps track of certain information in order to maintain the correct pipeline operation. For example, for some standards, motion vectors of the macroblock may be kept as the predictors for future motion vector derivation.

The variable-length decoder 306 performs decoding of variable-length codes (VLC) in the compressed bit stream to extract values, such as DCT coefficients, from the compressed data stream. The VLD 306 decodes variable-length codes in as little as one clock, depending on the specific code being decoded. The VLD 306 is designed to support the worst-case requirement for VLD operation with MPEG-2 HDTV (MP@HL). The VLD 306 includes a code table random access memory (RAM) for fastest performance and greatest flexibility.

In an illustrative embodiment of the present invention, the VLD 306 is architected as a coprocessor of the core processor 302. That is, it can operate on a single-command basis where the core processor issues a command (via a coprocessor instruction) and waits (via a Move From Coprocessor instruction) until it is executed by the VLD 306, without polling to determine completion of the command. This increases performance when a large number of VLC codes are parsed under software control. Additionally, the VLD 306 can operate on a block-command basis where the core processor 302 commands the VLD 306 to decode a complete block of VLC codes, such as DCT coefficients, and the core processor 302 continues to perform other tasks in parallel. In this case, the core processor 302 verifies the completion of the block operation by checking a status bit in the VLD 306. The VLD produces results (tokens) that are stored in decoder memory 316.

The inverse quantizer module 308 performs run-level code (RLC) decoding, inverse scanning (also called zig-zag scanning), inverse quantization and mismatch control. The coefficients, such as DCT coefficients, extracted by the VLD 306 are processed by the inverse quantizer 308 to bring the coefficients from the quantized domain to the DCT domain. In an exemplary embodiment of the present invention, the IQ module 308 obtains its input data (run-level values) from the decoder memory 316, as the result of the VLD module 306 decoding operation. In an alternative embodiment, the IQ module 308 obtains its input data directly from the VLD 306. This alternative embodiment is illustratively employed in conjunction with encoding/decoding algorithms that require relatively more involved throughput, such as MPEG-2 HD decoding, for best performance. The run-length, value and end-of-block codes read by the IQ module 308 are compatible with the format created-by the VLD module when it decodes blocks of coefficient VLCs, and this format is not dependent on the specific video coding format being decoded. In an exemplary embodiment, the IQ 308 and inverse transform 309 modules form part of a tightly coupled module labeled transform engine 307. This embodiment has the advantage of providing fast communication between modules 308 and 309 by virtue of being implemented in the same hardware block.

The IQ module 308 is designed in such a way that the core processor 302 can intervene at any point in the process, in case a particular decoding algorithm requires software processing of some aspect of the algorithmic steps performed by the IQ module 308. For example, there may be cases where a currently unknown algorithm could require a different form of rounding; this can be performed in the core processor 302.

The inverse transform module 309 performs the inverse transform to convert the coefficients produced by the IQ module 308 from the frequency domain to the spatial domain. The primary transform supported is the IDCT, as specified in MPEG-2, MPEG-4, IEEE, and several other standards. The inverse transform module 309 also supports alternative related transforms, such as the "linear" transform in H.26L (also known as JVT), which is not quite the same as IDCT.

In an illustrative embodiment of the present invention, the coefficient input to the inverse transform module 309 is read from decoder memory 316, where it was placed after inverse quantization by the IQ module 308. The transform result is written back to decoder memory 316. In an exemplary embodiment, the inverse transform module 309 uses the same memory location in decoder memory 316 for both its input and output, allowing a savings in on-chip memory usage. In an alternative embodiment, the coefficients produced by the IQ module are provided directly to the inverse transform module 309, without first depositing them in decoder memory 316. To accommodate this direct transfer of coefficients, in one embodiment of the present invention, the IQ module 308 and inverse transform module 309 use a common interface directly between them for this purpose. In an exemplary embodiment, the transfer of coefficients from the IQ module 308 to the inverse transform module 309 can be either direct or via decoder memory 316. For encoding/decoding algorithms that require very high rates of throughput, such as MPEG-2 HD decoding, the transfer is direct in order to save time and improve performance.

The pixel filter 310 performs pixel filtering and interpolation as part of the motion compensation process. Motion compensation is performed when an image segment from a previously decoded frame resembles an image segment in the present frame, perhaps at a different location within the frame. Rather than recreate the image anew from scratch, a previous image is used and just moved to the proper location within the frame, to form the basis for the current frame. The new location is indicated by motion vectors that denote the spatial displacement in the frame with respect to the reference frame.

The pixel filter 310 performs the interpolation necessary when the best-fit translation of a segment of the reference picture for motion-compensation does not use whole-pixel translations. For example, a hypothetical motion vector may indicate to move a particular block 10.5 pixels to the right and 20.25 pixels down for the motion-compensated prediction. In an illustrative embodiment of the present invention, the motion vectors are decoded by the VLD 306 in a previous processing pipeline stage and are converted by the core processor 302 into a format that the pixel filter can use. Thus, the pixel filter 310 gets the motion information as vectors and not just bits from the bitstream during decoding of the "current" macroblock in the "current" pipeline stage. The data for a given macroblock is stored in memory after decoding of said macroblock is complete; once that has occurred the data may be used as a reference for decoding other macroblocks. In an illustrative embodiment, the reference picture data is stored in DRAM 110. If and when that reference macroblock data is needed for motion compensation of another macroblock, the pixel filter 310 retrieves the reference macroblock pixel information from DRAM 110 and the motion vector from the core processor 302 and performs pixel filtering. In some embodiments the reference pixel information is transferred from DRAM 110 to decoder memory 316 by the DMA/bridge 304 before the pixel filter 310 retrieves the pixel data from decoder memory 316. The pixel filter stores the filter result (pixel prediction data) in decoder memory 316 in an illustrative embodiment.

The motion compensation module 312 reconstructs the macroblock being decoded by performing the addition of the decoded difference (or residual or "error") pixel information from the inverse transform module 309 to the pixel prediction data from the output of the pixel filter 310.

The loop filter 313 and post filter 315 perform de-blocking filter operations. They may also perform de-ringing operations. In an illustrative embodiment of the present invention, the loop filter 313 and post filter 315 are combined in one filter module 314, as shown in FIG. 3. The filter module 314 in an illustrative embodiment is the same processing structure as described for 311, except that it is programmed to perform the functionality of 313 and 315. Some decoding algorithms employ a loop filter and others employ a post filter. Therefore, the filter module 314 (or loop filter 313 and post filter 315 independently) is programmable or configurable to turn on either the loop filter 313 or the post filter 315 or both. In an illustrative embodiment, the filter module 314 (or loop filter 313 and post filter 315) has a register that controls whether a loop filter or post filter scheme is employed. The core processor 302 programs the filter module register according to the bitstream semantics.

In one embodiment of the present invention, the input data to the loop filter 313 and post filter 315 comes from decoder memory 316. This data includes pixel and block/macroblock parameter data generated by other modules in the decoding system 300. The output data from the loop filter 313 and post filter 315 is written into decoder memory 316 in an illustrative embodiment. The core processor 302 then causes the processed data to be put in its correct location in main memory. In another illustrative embodiment, the loop filter 313 and/or post filter 315 obtain data from DRAM 110, not via decoder memory 316; and the output data from the loop filter 313 and post filter 315 is written to DRAM 110 without being written to decoder memory 316.

In the embodiment wherein loop filter 313 and post filter 315 are separate hardware units, the loop filter 313 and post filter 315 can be programmed to perform similar functions. The difference is where in the processing pipeline each filter 313, 315 does its work. The loop filter 313 processes data within the reconstruction loop and the results of the filter are used in the reconstruction of data. The post filter 315 processes data that has already been reconstructed and is fully decoded in the two-dimensional picture domain.

In an illustrative embodiment, the core processor 302, bridge module 304, VLD 306, IQ 308, inverse transform module 309, pixel filter 310, motion compensation module 312, loop filter 313 and post filter 315 have access to decoder memory 316 via the internal bus 322. In an exemplary embodiment of the present invention, the VLD 306, IQ 308, inverse transform module 309, pixel filter 310, motion compensation module 312, loop filter 313 and post filter 315 illustratively use the decoder memory 316 as the source and destination memory for their normal operation. The CPU has access to decoder memory 316, and the bridge module 304 can transfer data between system memory 316 and the main system memory (DRAM). The arbiter for decoder memory 316 is in the bridge module 304. In an illustrative embodiment, decoder memory 316 is a static random access memory (SRAM) unit. In another illustrative embodiment, the PVLD 306 obtains data from DRAM 110, and the destination for the output of the loop filter 313 and post filter 315 is DRAM 110.

The bridge module 304 performs several functions. In an illustrative embodiment, it includes an interconnection network to connect all the other modules of the MVP as shown schematically as internal bus 322 and register bus 324. It is the bridge between the various modules of decoding system 300 and the system memory. It is the bridge between the register bus 324, the core processor 302, and the main chip-level register bus. It also includes a DMA engine to service the memories within the decoder system 300, including decoder memory 316 and local memory units within individual modules such as VLD 306. The bridge module illustratively includes an asynchronous interface capability and it supports different clock rates in the decoding system 300 and the main memory bus, with either clock frequency being greater than the other.

The bridge module 304 implements interfaces to all of the modules of the decoding system 300. These interfaces may be similar to one another or they may differ, depending on the choices that are convenient for the implementer. In the embodiment where the core processor is a MIPS it may have a single pre-defined interface. In the embodiment wherein decoder memory 316 is an SRAM unit, the SRAM implements standard SRAM interfaces. Logical register bus 324 connects all the modules, except where the core processor 302 is a MIPS processor that has only a single interface, which serves the purposes of accessing registers and memory.

The display feeder module 318 reads decoded pictures (frames or fields, as appropriate) from main memory in their native decoded format (4:2:0, for example), converts the video into 4:2:2 format, and may perform horizontal scaling using a polyphase filter. In an exemplary embodiment, the polyphase filter is an 8 tap, 11 phase filter. The output is illustratively standard 4:2:2 format YCrCb video, in the native color space of the coded video (for example, ITU-T 709-2 or ITU-T 601-B color space), and with a horizontal size that ranges from 160 to 1920 pixels. The horizontal scaler corrects for coded picture sizes that differ from the display size, and it also provides the ability to scale the video to arbitrary smaller or larger sizes, for use in conjunction with subsequent 2-dimensional scaling where required for displaying video in a window, for example. In one embodiment, the display feeder 318 is adapted to supply two video scan lines concurrently, in which case the horizontal scaler in the feeder 318 is adapted to scale two lines concurrently, using identical parameters.

Figure 5:
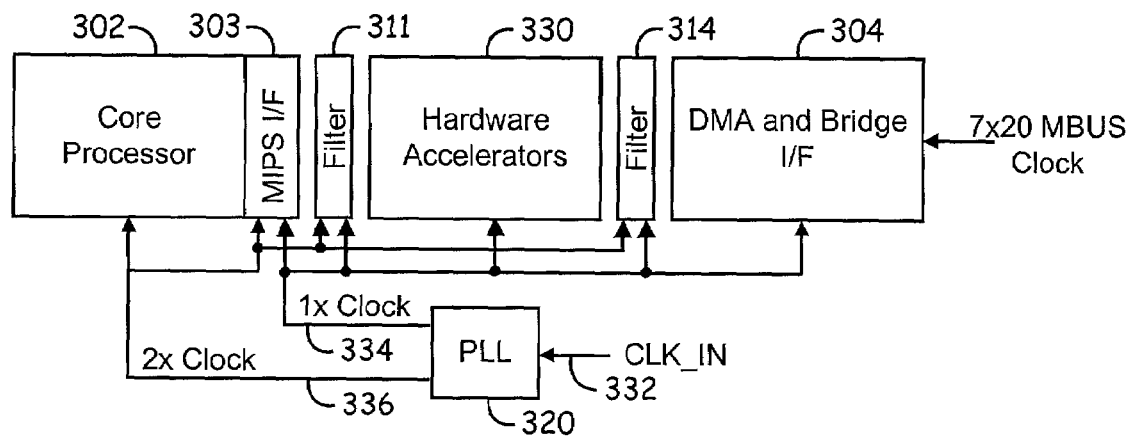
FIG. 5 is a block diagram depicting a clocking scheme for a decoding system according to an illustrative embodiment of the present invention.

FIG. 5 is a block diagram depicting a clocking scheme for decoding system 300 according to an illustrative embodiment of the present invention. In FIG. 5, elements that are common to FIGS. 3 and 4 are given like reference numbers. In an illustrative embodiment of the present invention, hardware accelerator block 330 includes VLD 306, IQ 308, and inverse transform module 309, while one instance of the filter engine module 311 implements pixel filter 310 and motion compensation 312, and yet another instance of the filter module 314 implements loop filter 313 and post filter 315. In an illustrative embodiment of the present invention, the core processor 302 runs at twice the frequency of the other processing modules. In an exemplary embodiment, the core processor runs at 243 MHz and the individual modules at half this rate, i.e., 121.5 MHz. An elegant, flexible and efficient clock strategy is achieved by generating two internal clocks in an exact 2:1 relationship to each other. The system clock signal (CLK_IN) 332 is used as input to the phase-locked loop element (PLL) 320, which is a closed-loop feedback control system that locks to a particular phase of the system clock to produce a stable signal with little jitter. The PLL element 320 generates a 1× clock (targeting, e.g., 121.5 MHz) for the hardware accelerators 330, filter engines 311 and 314, bridge module 304 and the core processor bus interface 303, while generating a 2× clock (targeting, e.g., 243 MHz) for the core processor 302, the core processor bus interface 303 and filter engines 311 and 314. Note that FE 311 and FE 314 receive both 243 Mhz and 121.5 Mhz clocks. In an alternative embodiment of the present invention, hardware accelerators block 330 includes VLD 306, IQ, 308, inverse transform module 309, pixel filter 310, motion compensation module 312 and filter engine 314. The ratios of the 1× and 2× clocks to the reference clock frequency can be programmable, to cover the possibility that the core processor 302 will not meet timing at the target clock frequency, e.g., 243 MHz. It also allows the decoding system 300 to run faster than the target frequency if the circuit timing supports it.

Referring again to FIGS. 3 and 4, for typical video formats such as MPEG-2, picture-level processing, from the sequence level down to the slice level, including the sequence headers, picture headers, time stamps, and buffer management, are performed by the core processor 302. The VLD 306 assists the core processor when a bit-field in a header is to be decoded. Picture level processing does not overlap with macroblock level decoding The macroblock level decoding is the main video decoding process. It occurs within a direct execution loop. In an illustrative embodiment of the present invention, hardware blocks VLD 306, IQ 308, inverse transform module 309, pixel filter 310, motion compensation module 312 (and, depending on which decoding algorithm is being executed, possibly loop filter 313) are all involved in the decoding loop. The core processor 302 controls the loop by polling the status of each of the hardware blocks involved and directing the operations of the various accelerator modules.

Figure 6:
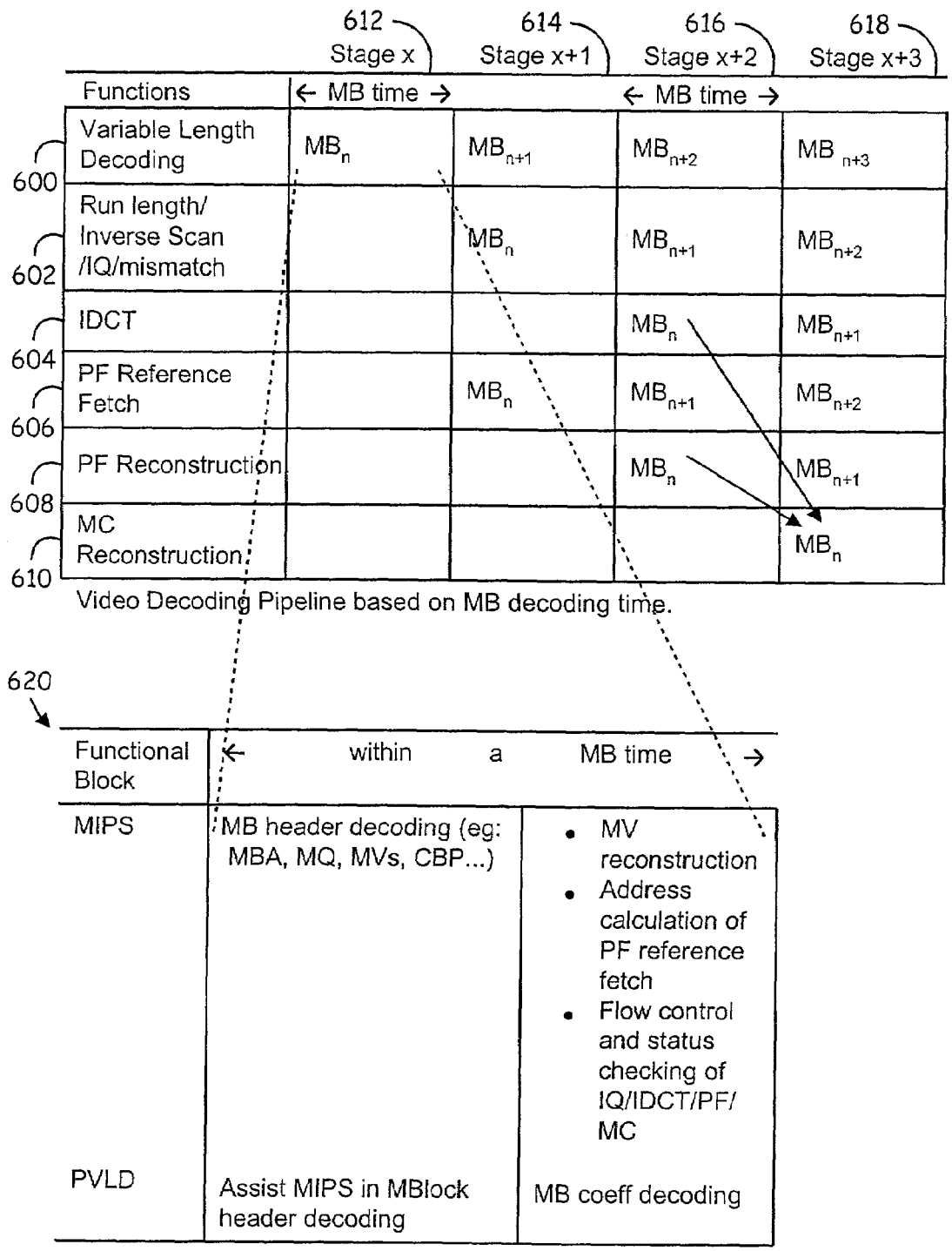
FIG. 6 is a chart representing a decoding pipeline according to an illustrative embodiment of the present invention.

In an illustrative embodiment of the present invention, the actions of the various hardware blocks are arranged in an execution pipeline comprising a plurality of stages. As used in the present application, the term "stage" can refer to all of the decoding functions performed during a given time slot, or it can refer to a functional step, or group of functional steps in the decoding process. The pipeline scheme aims to achieve maximum throughput in defined worst-case decoding scenarios. Pursuant to this objective, it is important to utilize the core processor 302 efficiently. FIG. 6 is a chart representing a decoding pipeline according to an illustrative embodiment of the present invention. The number decoding functions in the pipeline may vary depending on the target applications. Due to the selection of hardware elements that comprise the pipeline, the pipeline architecture of the present invention can accommodate, at least, substantially any existing or future compression algorithms that fall into the general class of block-oriented algorithms.

The rows of FIG. 6 represent the decoding functions performed as part of the pipeline according to an exemplary embodiment. Variable-length decoding 600 is performed by VLD 306. Run length/inverse scan/IQ/mismatch 602 are functions performed by IQ module 308. Inverse transform operations 604 are performed by inverse transform module 309. Pixel filter reference fetch 606 and pixel filter reconstruction 608 are performed by pixel filter 310. Motion compensation reconstruction 610 is performed by motion compensation module 312. The columns of FIG. 6 represent the pipeline stages. The designations $MB_n$, $MB_{n+1}$, $MB_{n+2}$, etc. represent the $n^{th}$ macroblock in a data stream, the $n+1^{th}$ macroblock in the data stream, the $n+2^{nd}$ macroblock, and so on. The pipeline scheme supports one pipeline stage per module, wherein any hardware module that depends on the result of another module is arranged in a following MB pipeline stage. In an illustrative embodiment, the pipeline scheme can support more than one pipeline stage per module.

At any given stage in the pipeline, while a given function is being performed on a given macroblock, the next macroblock in the data stream is being worked on by the previous function in the pipeline. Thus, at stage x 612 in the pipeline represented in FIG. 6, variable-length decoding 600 is performed on $MB_n$. Exploded view 620 of the variable-length decoding function 600 demonstrates how functions are divided between the core processor 302 and the VLD 306 during this stage, according to one embodiment of the present invention. Exploded view 620 shows that during stage x 612, the core processor 302 decodes the macroblock header of $MB_n$. The VLD 306 assists the core processor 302 in the decoding of macroblock headers. The core processor 302 also reconstructs the motion vectors of $MB_n$, calculates the address of the pixel filter reference fetch for $MB_n$, performs pipeline flow control and checks the status of IQ module 308, inverse transform module 309, pixel filter 310 and motion compensator 312 during stage x 612. The hardware blocks operate concurrently with the core processor 302 while decoding a series of macroblocks. The core processor 302 controls the pipeline, initiates the decoding of each macroblock, and controls the operation of each of the hardware accelerators. The core processor firmware checks the status of each of the hardware blocks to determine completion of previously assigned tasks and checks the buffer availability before advancing the pipeline. Each block will then process the corresponding next macroblock. The VLD 306 also decodes the macroblock coefficients of $MB_n$ during stage x. Block coefficient VLC decoding is not started until the core processor 302 decodes the whole macroblock header. Note that the functions listed in exploded view 620 are performed during each stage of the pipeline of FIG. 6, even though, for simplicity's sake, they are only exploded out with respect to stage x 612.

At the next stage x+1 614, the inverse quantizer 308 works on $MB_n$ (function 602) while variable-length decoding 600 is performed on the next macroblock, $MB_{n+1}$. In stage x+1 614, the data that the inverse quantizer 308 works on are the quantized transform coefficients of $MB_n$ extracted from the data stream by the VLD 306 during stage x 612. In an exemplary embodiment of the present invention, also during stage x+1 614, the pixel filter reference data is fetched for $MB_n$ (function 606) using the pixel filter reference fetch address calculated by the core processor 302 during stage x 612.

Then, at stage x+2 616, the inverse transform module 309 performs inverse transform operations 604 on the $MB_n$ transform coefficients that were output by the inverse quantizer 308 during stage x+1. Also during stage x+2, the pixel filter 310 performs pixel filtering 608 for $MB_n$ using the pixel filter reference data fetched in stage x+1 614 and the motion vectors reconstructed by the core processor 302 in stage x 612. Additionally at stage x+2 616, the inverse quantizer 308 works on $MB_{n+1}$ (function 602), the pixel filter reference data is fetched for $MB_{n+1}$ (function 606), and variable-length decoding 600 is performed on $MB_{n+2}$.

At stage x+3 618, the motion compensation module 312 performs motion compensation reconstruction 610 on $MB_n$ using decoded difference pixel information produced by the inverse transform module 309 (function 604) and pixel prediction data produced by the pixel filter 310 (function 608) in stage x+2 616. Also during stage x+3 618, the inverse transform module 309 performs inverse transform operations 604 on $MB_{n+1}$, the pixel filter 310 performs pixel filtering 608 for $MB_{n+1}$, the inverse quantizer 308 works on $MB_{n+2}$ (function 602), the pixel filter reference data is fetched for $MB_{n+2}$ (function 606), and variable-length decoding 600 is performed on $MB_{n+3}$. While the pipeline of FIG. 6 shows just four pipeline stages, in an illustrative embodiment of the present invention, the pipeline includes as many stages as is needed to decode a complete incoming data stream.

Figure 7:
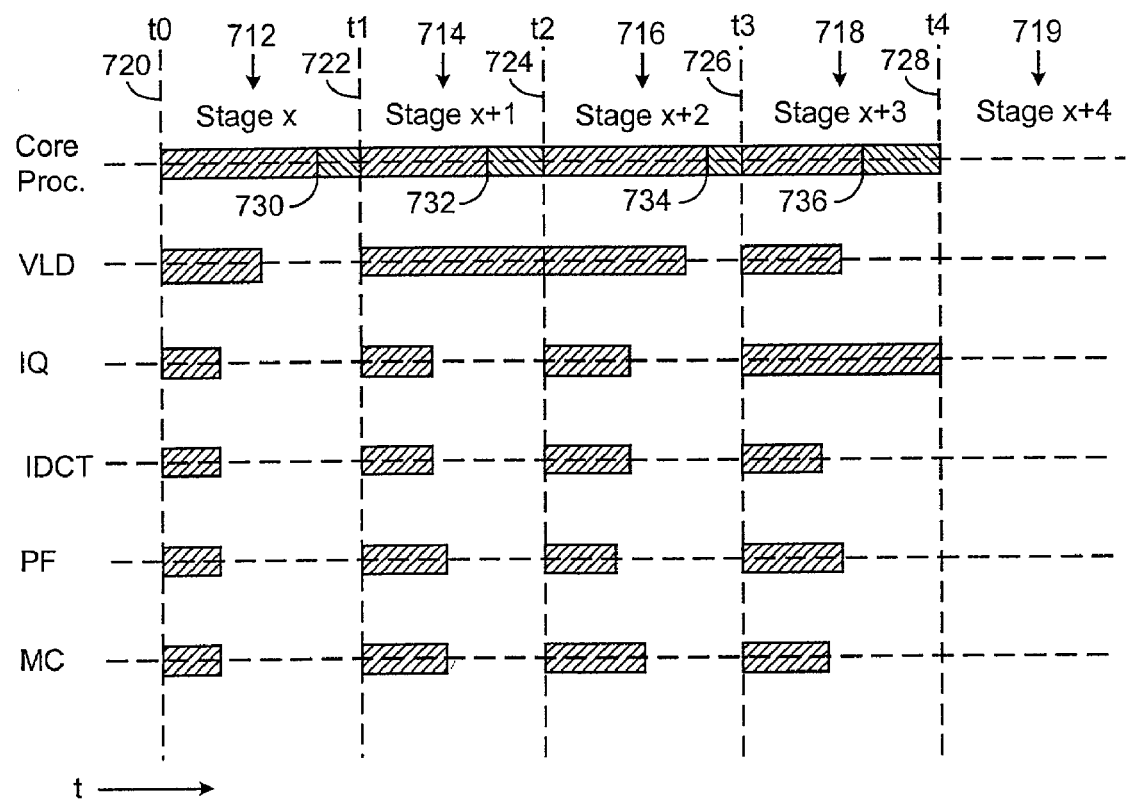
FIG. 7 is a chart representing a decoding pipeline according to an illustrative embodiment of the present invention.

The above-described macroblock-level pipeline advances stage-by-stage. FIG. 7 is a chart representing a decoding pipeline according to an illustrative embodiment of the present invention. The rows of FIG. 7 represent the hardware modules that comprise the decoding pipeline according to an exemplary embodiment of the present invention. FIG. 7 shows a decoding pipeline that is full, i.e., each of the decoding functions are operating on macroblock data. The solid horizontal bars corresponding to each hardware module represent how long each hardware module is active for each stage of a hypothetical decoding pipeline. The pipeline of FIG. 7 is hypothetical and is merely used to demonstrate the pipeline timing; the actual time a given function takes in a given stage depends on the characteristics of the bitstream. As can be seen in FIG. 7, the pipeline advances after all the tasks in the current stage are completed. The time elapsed in one macroblock pipeline stage will be referred to herein as the macroblock (MB) time. The MB time is not a constant and varies from stage to stage. It depends on the encoded bitstream characteristics and is determined by the bottleneck module, which is the one that finishes last in that stage. Any module, including the core processor 302 itself, can be the bottleneck from stage to stage and it is not pre-determined at the beginning of each stage.

In stage x 712 of the hypothetical pipeline of FIG. 7, the core processor 302 is the last module to complete its tasks for that stage, which it does at point 730. After the core processor 302 completes its tasks for stage x at point 730, there is a short time period wherein the core processor 302 checks the other modules to see if they have completed their tasks for the stage and then directs the other modules to begin the next stage, that is, to begin processing their respective next macroblocks in the pipeline.

The next stage x+1 714 begins at time $t_1$ 722. In stage x+1, the core processor 302 completes its tasks at point 732. The core processor 302 then begins checking the other modules for completion and finds that the VLD 306 is still decoding block coefficients for its current macroblock. Thus the core processor 302 continues polling the VLD 306 for completion. When the VLD 306 finishes its tasks, the core processor 302 discovers this condition and directs all modules to begin stage x+2 716 operations on the appropriate macroblock data at time $t_2$ 724.

In stage x+2 716, the core processor 302 finishes performing its operations on the relevant macroblock data at point 734. The core processor then polls the other modules. Finding that all of the other modules have completed their tasks for stage x+2 716, the core processor initiates stage x+3 718 at time $t_3$ 726.

In stage x+3 718, the inverse quantizer 308 is the last module to complete its operations, at time $t_4$ 728. Thus the core processor 302 initiates stage x+4 719 at time t₄ 728. In an illustrative embodiment of the present invention, the bottleneck time for each stage is reduced by means of firmware control, improving the throughput and directly contributing to performance enhancement. The pipeline timing demonstrated in FIG. 7 can be implemented in any type of decoding scheme (including, e.g., audio decoding) employing any combination of acceleration modules.

For a given encoding/decoding algorithm, each module, including the core processor 302, has a defined and predetermined task or group of tasks. The clocks needed for each module are also predetermined. The macroblock time for each module is substantially constant. Therefore, in an illustrative embodiment of the present invention, the hardware acceleration pipeline is optimized by hardware balancing each module in the pipeline according to the compression format of the data stream.

The main video decoding operations occur within a direct execution loop with polling of the accelerator functions. The coprocessor/accelerators operate concurrently with the core processor while decoding a series of macroblocks. The core processor 302 controls the pipeline, initiates the decoding of each macroblock, and controls the operation of each of the accelerators. Upon completion of each macroblock processing stage in the core processor, firmware checks the status of each of the accelerators to determine completion of previously assigned tasks. In the event that the firmware gets to this point before an accelerator module has completed its required tasks, the firmware polls for completion. This is appropriate, since the pipeline cannot proceed efficiently until all of the pipeline elements have completed the current stage, and an interrupt driven scheme would be less efficient for this purpose.

Each hardware module 306, 308, 309, 310, 312, 313, 315 is independently controllable by the core processor 302. The core processor 302 drives a hardware module by issuing a certain start command after checking the module's status. In one embodiment, the core processor 302 issues the start command by setting up a register in the hardware module.

Figure 8:
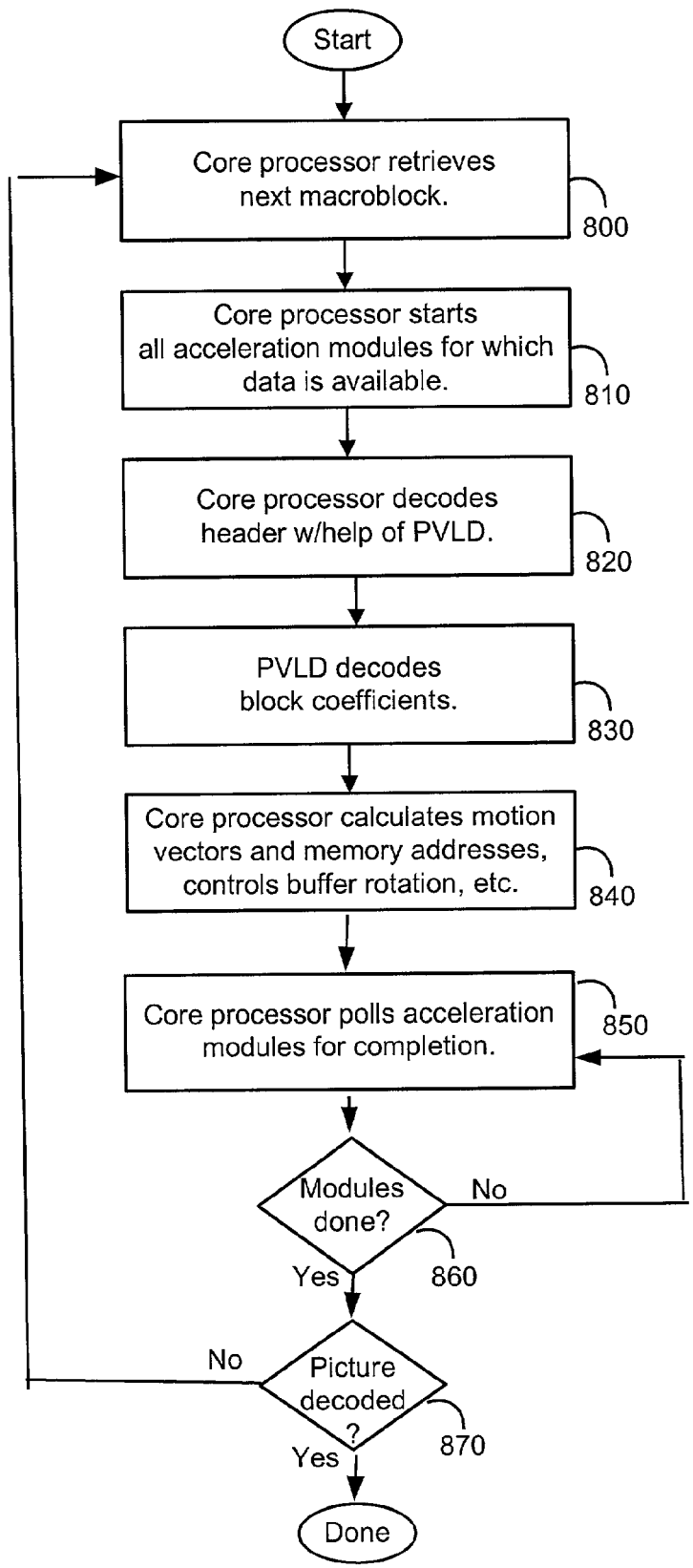
FIG. 8 is a flowchart representing a macroblock decoding loop according to an illustrative embodiment of the present invention.

FIG. 8 is a flowchart representing a macroblock decoding loop according to an illustrative embodiment of the present invention. FIG. 8 depicts the decoding of one video picture, starting at the macroblock level. In an illustrative embodiment of the present invention, the loop of macroblock level decoding pipeline control is fully synchronous. At step 800, the core processor 302 retrieves a macroblock to be decoded from system memory 110. At step 810, the core processor starts all the hardware modules for which input data is available. The criteria for starting all modules depends on an exemplary pipeline control mechanism illustrated in FIGS. 6 and 7. At step 820, the core processor 302 decodes the macroblock header with the help of the VLD 306. At step 830, when the macroblock header is decoded, the core processor 302 commands the VLD 306 for block coefficient decoding. At step 840, the core processor 302 calculates motion vectors and memory addresses, such as the pixel filter reference fetch address, controls buffer rotation and performs other housekeeping tasks. At step 850, the core processor 302 checks to see whether the acceleration modules have completed their respective tasks. At decision box 860, if all of the acceleration modules have completed their respective tasks, control passes to decision box 870. If, at decision box 860, one or more of the acceleration modules have not finished their tasks, the core processor 302 continues polling the acceleration modules until they have all completed their tasks, as shown by step 850 and decision box 860. At decision box 870, if the picture is decoded, the process is complete. If the picture is not decoded, the core processor 302 retrieves the next macroblock and the process continues as shown by step 800. In an illustrative embodiment of the present invention, when the current picture has been decoded, the incoming macroblock data of the next picture in the video sequence is decoded according to the process of FIG. 8.

Figure 9:
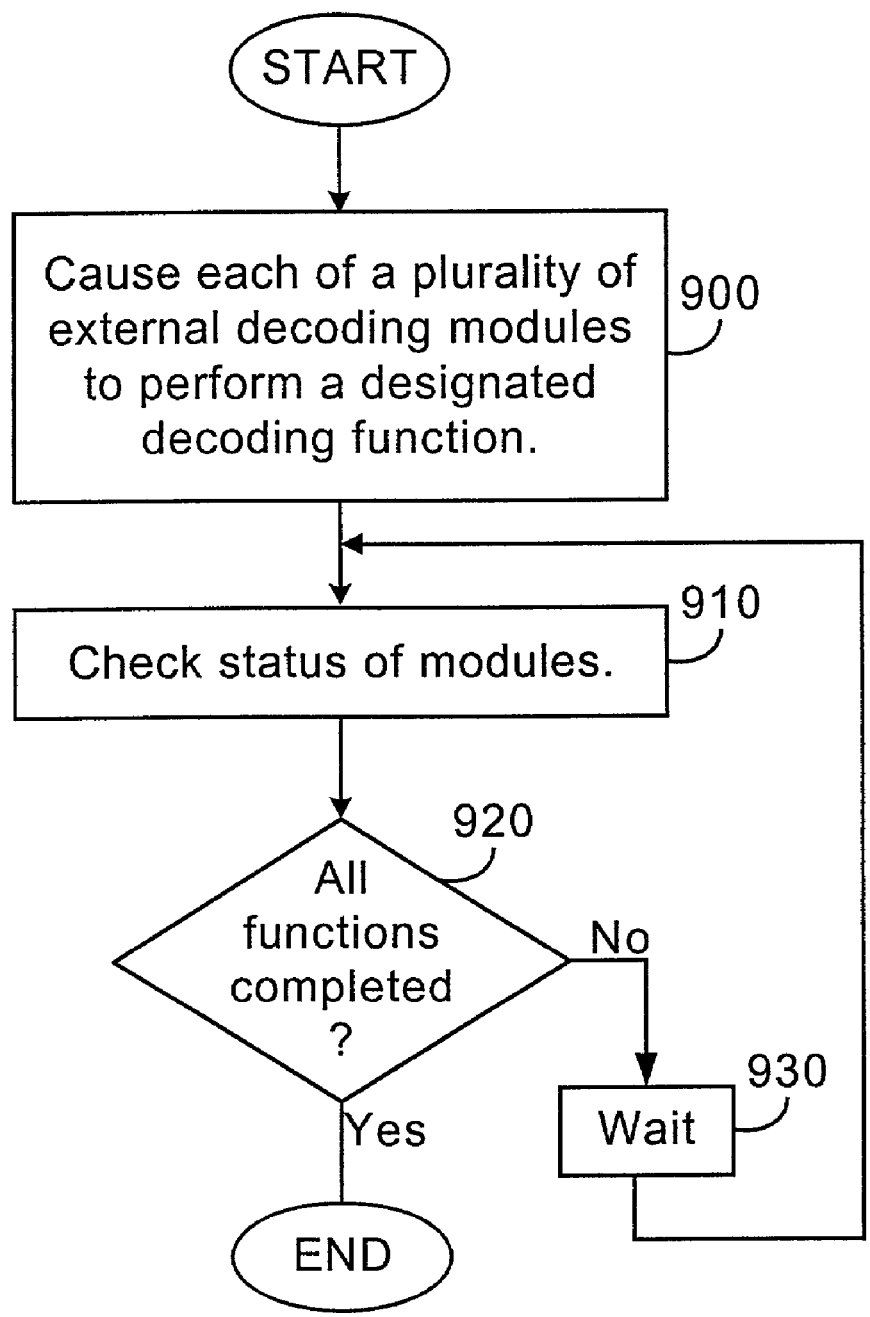
FIG. 9 is a flowchart representing a method of controlling a decoding pipeline stage according to an illustrative embodiment of the present invention.

In an illustrative embodiment of the present invention, the loop of slice/macroblock level decoding pipeline control is fully synchronous. That is, the timing of the decoding pipeline is not dependent on the clock. Instead, each successive stage begins when all of the functions from the previous stage are completed. FIG. 9 is a flowchart representing a method of controlling a decoding pipeline stage according to an illustrative embodiment of the present invention. At step 900, a core processor (such as core processor 302) causes each of a plurality of decoding modules (such as decoding modules 306, 308, 309, 310, 312 and 313) to perform their designated functions. At step 910, the core processor 302 checks the status of the decoding modules. At decision box 920, if the status check reveals that all of the functions are completed, the current stage is finished. If one or more functions are still being performed, the core processor 302 waits, as shown at step 930, and then again checks the status of the modules. The core processor continues checking the status of the modules until all of the functions are completed.

Figure 10:
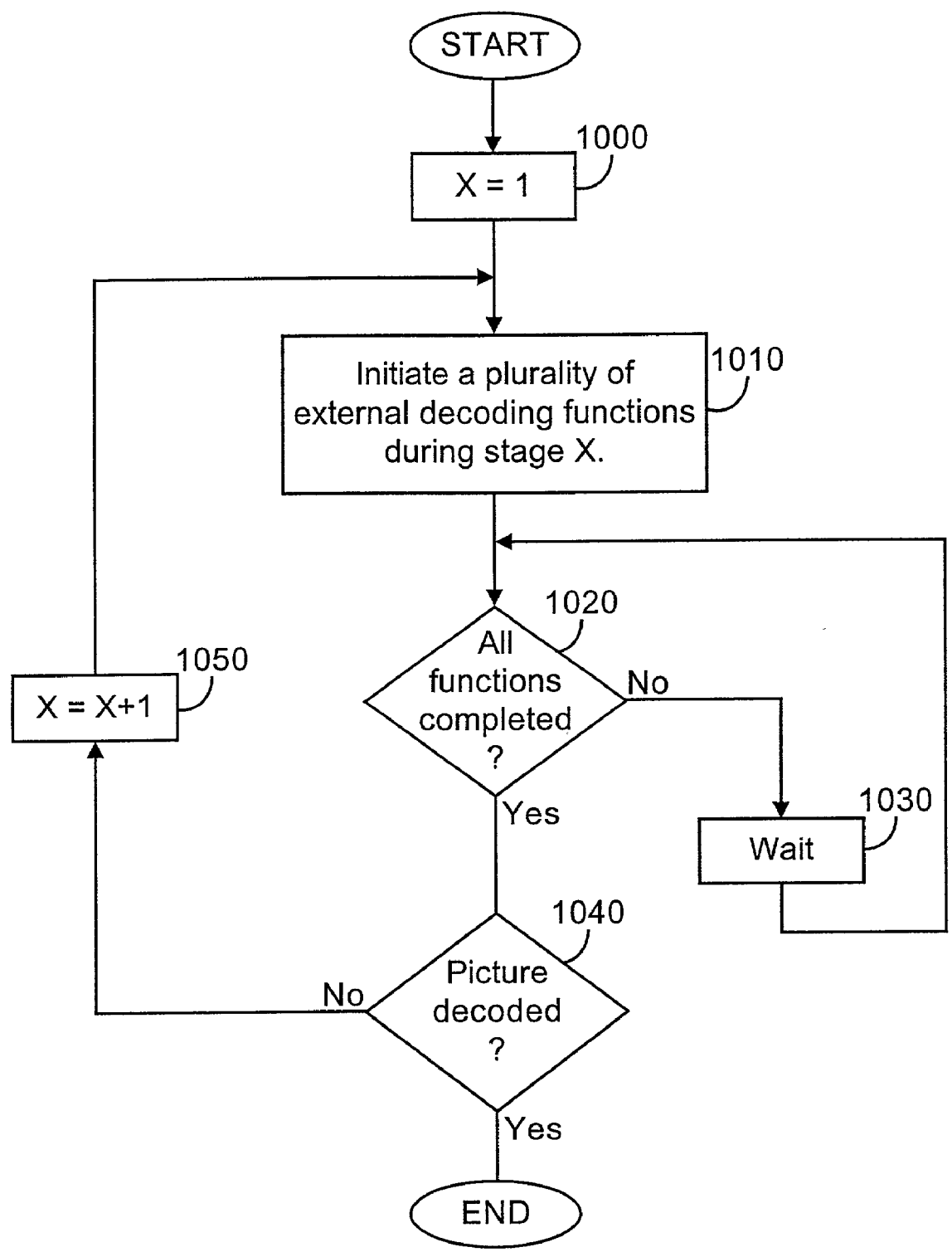
FIG. 10 is a flowchart representing a method of decoding one picture of a video sequence according to an illustrative embodiment of the present invention.

FIG. 10 is a flowchart representing a method of decoding one picture of a video sequence according to an illustrative embodiment of the present invention. At step 1000, x is 1, indicating stage 1. At step 1010, the core processor 302 initiates a plurality of decoding functions during stage x. At decision box 1020, it is queried whether all of the decoding functions are completed. If one or more decoding functions are still being performed, the core processor 302 waits, as shown at step 1030, and then again checks the status of the modules at decision box 1020. The core processor 302 continues checking the status of the modules until all of the functions are completed. When all of the decoding functions are completed, it is determined whether decoding of the current picture is complete, as shown by decision box 1040. If the picture is decoded, the process of decoding the picture is complete. If data from a subsequent picture is in the pipeline, the process of FIG. 10 will be repeated for that picture. If, at decision box 1040, decoding of the current picture is not finished, x is incremented, as shown at step 1050, to indicate that the next stage is being entered. The decoding functions are initiated for the new stage, as shown at step 1010.

In an alternative embodiment of the present invention, the functions of two or more hardware modules are combined into one pipeline stage and the macroblock data is processed by all the modules in that stage sequentially. For example, in an exemplary embodiment, inverse transform operations for a given macroblock are performed during the same pipeline stage as IQ operations. In this embodiment, the inverse transform module 309 waits idle until the inverse quantizer 308 finishes and the inverse quantizer 308 becomes idle when the inverse transform operations start. This embodiment will have a longer processing time for the "packed" pipeline stage. Therefore, in an illustrative embodiment of the present invention, the packed pipeline stage is only used in non-demanding decoding tasks such SD/SIF size decoding applications. The benefits of the packed stage embodiment include fewer pipeline stages, fewer buffers and possibly simpler control for the pipeline.

In one embodiment of the present invention, the VLD module 306 includes two variable-length decoders. Each of the two variable-length decoders can be hardwired to efficiently perform decoding according to a particular video compression standard, such as MPEG2 HD. One or both of them can be optionally set as a programmable VLD engine, with a code RAM to hold VLC tables for media coding formats other than MPEG2. The two VLD engines are controlled independently by the core processor 302, and either one or both of them will be employed at any given time, depending on the application. In an illustrative embodiment, the two VLDs (VLD0 and VLD1) are employed concurrently to alternately process two consecutive rows of a video frame. In dual-row decoding, the core processor 302 starts the VLD 306 for block coefficients VLC decoding after getting the cbp pattern, in a manner similar to the single-row decoding described above with respect to FIG. 6. But in dual row decoding, the VLD 306 is allowed to do and finish its block coefficients VLC decoding job during the next MB pipeline stage when the core processor 302 and the other VLD are working on a MB in another row. In this manner, the VLD 306 is less likely to be the bottleneck in the decoding pipeline. This can increase the efficiency of the decoding pipeline since the VLD 306 is often the bottleneck in a pipeline employing only one VLD. In an illustrative embodiment of the present invention, dual row decoding is employed to do MPEG2 HD decoding.

FIG. 11 is a chart representing a dual-row decoding pipeline according to an illustrative embodiment of the present invention. The rows of FIG. 11 represent the decoding functions performed as part of the pipeline according to an exemplary embodiment of the present invention. The functions include core processor operations 1100, variable-length decoding performed by VLD0 1102, variable-length decoding performed by VLD1 1104, inverse quantizer operations 1106, inverse transform operations 1108, pixel filter reference fetch 1110, pixel filter reconstruction 1112, motion compensation 1114 and DMA operations 1116. The columns of FIG. 11 represent the pipeline stages. The designation (i, j) denotes the macroblock coordinates, i.e., the $j^{th}$ MB in the $i^{th}$ row.

As shown in FIG. 11, in stage 1, the core processor 302 and VLD0 work on $MB_{0,0}$ ($MB_0$ in $row_0$). Note that first the core processor 302 performs macroblock header decoding with the assistance of VLD0. When the macroblock header is decoded, the core processor 302 continues performing other tasks while VLD0 begins decoding the block coefficients of $MB_{0,0}$. When the core processor 302 completes the tasks that it is performing with respect to $MB_{0,0}$, the core processor 302 initiates stage 2 regardless of whether VLD0 has finished decoding the block coefficients of $MB_{0,0}$. In an alternative embodiment of the present invention, after assisting the core processor 302 with decoding the macroblock header, VLD0 waits until stage 2 to begin decoding the block coefficients of $MB_{0,0}$.

In stage 2, the core processor 302 and VLD1 work on $MB_{1,0}$ ($MB_0$ in $row_1$). First the core processor 302 performs macroblock header decoding on $MB_{1,0}$ with the assistance of VLD1. When the macroblock header is decoded, the core processor 302 continues performing other tasks while VLD1 begins decoding the block coefficients of $MB_{1,0}$. Also in stage 2, if VLD0 did not finish decoding the block coefficients of $MB_{0,0}$ in stage 1, it (VLD0) continues to do so in stage 2. In the alternative embodiment mentioned above with respect to stage 1, VLD0 waits until stage 2 to begin decoding the block coefficients of $MB_{0,0}$. When the core processor 302 completes the tasks that it is performing with respect to $MB_{1,0}$, the core processor 302 polls VLD0 to see if it is done decoding the block coefficients of $MB_{0,0}$. If VLD0 is done with $MB_{0,0}$, the core processor 302 initiates stage 3 regardless of whether VLD1 has finished decoding the block coefficients of $MB_{1,0}$. If VLD0 is not yet finished decoding the block coefficients of $MB_{0,0}$, the core processor waits until VLD0 is finished with $MB_{0,0}$ and initiates stage 3 at that time, again, regardless of whether VLD1 has finished decoding the block coefficients of $MB_{1,0}$.

In stage 3, the core processor 302 and VLD0 work on $MB_{0,1}$ ($MB_1$ in $row_0$) as described above with respect to stages 1 and 2. Also in stage 3, IQ module 308 operates on $MB_{0,0}$, performing run-level code decoding, inverse scanning, inverse quantization and mismatch control. The data that the inverse quantizer 308 works on are the quantized transform coefficients of $MB_{0,0}$ extracted from the data stream by the VLD 306 during stage 2. Additionally in stage 3, VLD1 continues decoding the block coefficients of $MB_{1,0}$ if the decoding was not completed in stage 2. When the core processor 302 completes the tasks that it is performing with respect to $MB_{0,1}$, the core processor 302 polls VLD1 to see if it is done decoding the block coefficients of $MB_{1,0}$. The core processor 302 also polls IQ module 308 to see if it is done operating on $MB_{0,1}$. If VLD1 is done with $MB_{0,0}$ and IQ module 308 is done with $MB_{0,1}$, the core processor 302 initiates stage 4 regardless of whether VLD0 has finished decoding the block coefficients of $MB_{0,1}$. If either VLD1 or IQ module 308 are not yet finished, the core processor waits until VLD1 and IQ module 308 are both finished and initiates stage 4 at that time. In an exemplary embodiment of the present invention, also during stage 3, the pixel filter reference data is fetched for $MB_{0,0}$ (function 1110) using the pixel filter reference fetch address calculated by the core processor 302 during stage 1. In this case, the core processor 302 also polls the pixel filter 310 for completion prior to initiating stage 4.

In stage 4, the core processor 302 works on $MB_{1,1}$ ($MB_1$ in $row_1$), variable-length decoding is initiated on $MB_{1,1}$ by VLD1, IQ module 308 operates on $MB_{1,0}$ and the pixel filter reference data is fetched for $MB_{1,0}$ (function 1110). Also in stage 4, inverse transform module 309 performs the inverse transform on the $MB_{0,0}$ coefficients produced by the IQ module 308 in stage 3 and the pixel filter 310 performs pixel filtering 1112 for $MB_{0,0}$ using the pixel filter reference data fetched in stage 3 and the motion vectors reconstructed by the core processor 302 in stage 1. Additionally in stage 4, VLD0 continues decoding the block coefficients of $MB_{0,1}$ if the decoding was not completed in stage 3. When the core processor 302 completes its tasks with respect to $MB_{1,1}$, the core processor 302 polls VLD0, IQ module 308, inverse transform module 309 and pixel filter 310 to see if they have completed their present tasks. If the polled modules have completed their tasks, the core processor 302 initiates stage 5. If any of the polled modules are not yet finished, the core processor waits until they are all finished and initiates stage 5 at that time.

In stage 5, the core processor 302 works on $MB_{0,2}$ ($MB_2$ in $row_0$), variable-length decoding is initiated on $MB_{0,2}$ by VLD0, IQ module 308 operates on $MB_{0,1}$, inverse transform module 309 operates on the $MB_{1,0}$ coefficients, the pixel filter reference data is fetched for $MB_{0,1}$ (function 1110) and the pixel filter 310 performs pixel filtering 1112 for $MB_{1,0}$. Also in stage 5, the motion compensation module 312 performs motion compensation reconstruction 1114 on $MB_{0,0}$ using decoded difference pixel information produced by the inverse transform module 309 (function 1108) and pixel prediction data produced by the pixel filter 310 (function 1112) in stage 4. Additionally in stage 5, VLD1 continues decoding the block coefficients of $MB_{1,1}$ if the decoding was not completed in stage 4. When the core processor 302 completes its tasks with respect to $MB_{0,2}$, the core processor 302 polls VLD1, IQ module 308, inverse transform module 309, pixel filter 310 and motion compensation module 312 to see if they have completed their present tasks. If the polled modules have completed their tasks, the core processor 302 initiates stage 6. If any of the polled modules are not yet finished, the core processor waits until they are all finished and initiates stage 6 at that time.

In stage 6, the core processor 302 works on $MB_{1,2}$ ($MB_2$ in $row_1$), variable-length decoding is initiated on $MB_{1,2}$ by VLD1, IQ module 308 operates on $MB_{1,1}$, inverse transform module 309 operates on the $MB_{0,1}$ coefficients, the pixel filter reference data is fetched for $MB_{1,1}$ (function 1110), the pixel filter 310 performs pixel filtering 1112 for $MB_{0,1}$ and the motion compensation module 312 performs motion compensation reconstruction 1114 on $MB_{1,0}$. Also in stage 6, the DMA engine 304 places the result of the motion compensation performed with respect to $MB_{0,0}$ in system memory 110. Additionally in stage 5, VLD0 continues decoding the block coefficients of $MB_{0,2}$ if the decoding was not completed in stage 5. When the core processor 302 completes its tasks with respect to $MB_{1,2}$, the core processor 302 polls VLD1, IQ module 308, inverse transform module 309, pixel filter 310, motion compensation module 312 and DMA engine 304 to see if they have completed their present tasks. If the polled modules have completed their tasks, the core processor 302 initiates stage 7. If any of the polled modules are not yet finished, the core processor waits until they are all finished and initiates stage 7 at that time.

The decoding pipeline described above with respect to FIG. 11 continues as long as there are further macroblocks in the data stream to decode. The dual-row decoding pipeline demonstrated in FIG. 11 can be implemented in any type of decoding scheme (including, e.g., audio decoding) employing any combination of acceleration modules.

In general, the core processor 302 interprets the bits decoded (with the help of the VLD 306) for the appropriate headers and sets up and coordinates the actions of the hardware modules. More specifically, all header information, from the sequence level down to the macroblock level, is requested by the core processor 302. The core processor 302 also controls and coordinates the actions of each hardware module.

Each hardware module 306, 308, 309, 310, 312, 313, 315 performs the specific processing as instructed by the core processor 302 and sets up its status properly in a status register as the task is being executed and when it is done. Each of the modules has or shares a status register that is polled by the core processor to determine the module's status. Each hardware module is assigned a set of macroblock buffers in decoder memory 316 for processing purposes. Each hardware module signals the busy/available status of the working buffer(s) associated with it so that the core processor 302 can properly coordinate the processing pipeline.

In an exemplary embodiment of the present invention, the hardware accelerator modules 306, 308, 309, 319, 312, 313, 314, 315 generally do not communicate with each other directly. The accelerators work on assigned areas of decoder memory 316 and produce results that are written back to decoder memory 316, in some cases to the same area of decoder memory 316 as the input to the accelerator. In one embodiment of the present invention, when the incoming bitstream is of a format that includes a relatively large amount of data, or where the throughput requirement is relatively high, the accelerators in some cases may bypass the decoder memory 316 and pass data between themselves directly.

Although a preferred embodiment of the present invention has been described, it should not be construed to limit the scope of the appended claims. For example, the timing schemes and dual-row decoding schemes of the present invention are applicable to any type of media, including audio, in addition to the video media illustratively described herein. The timing schemes and dual-row decoding schemes can also be implemented with any combination of hardware acceleration modules, in addition to the acceleration modules illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of decoding an encoded digital data stream, comprising:
   (a) executing a first stage comprising:
      (i) performing a first decoding function on an $n^{th}$ data element of the data stream; and
      (ii) simultaneously performing a second decoding function on an $n+1^{st}$ data element of the data stream; and
   (b) when the first function is completed with respect to the $n^{th}$ data element and the second function is completed with respect to the $n+1^{st}$ data element, executing a second stage comprising:
      (i) performing the first decoding function on the $n+1^{st}$ data element; and
      (ii) simultaneously performing the second decoding function on an $n+2^{nd}$ element in the data stream.

2. The method of claim 1 further comprising:
   (c) sequentially executing additional stages in which the first decoding function is performed on the data element processed by the second decoding function in the previous stage and the second decoding function is performed on the next data element in the data stream, and wherein each successive stage begins when both decoding functions from the previous stage have been completed.

3. The method of claim 1 wherein the second decoding function for a given data element is dependent upon a result of the first decoding function for the given data element.

4. The method of claim 3 wherein the second decoding function for a given data element is performed on a result of the first decoding function for the given data element.

5. The method of claim 1 wherein performing a decoding function on a data element according to steps (a)(i), (a)(ii), (b)(i) and (b)(ii) comprises performing a decoding function on a processed version of the associated data element.

6. The method of claim 1 wherein the first stage further comprises a step (a)(iii) of performing a third decoding function on an $n+2^{nd}$ data element of the data stream while performing the first and second decoding functions according to performing steps (a)(i) and (a)(ii), and wherein the second stage further comprises a step (b)(iii) of performing the third decoding function on an $n+3^{rd}$ data element in the data stream while performing the first and second decoding functions according to performing steps (b)(i) and (b)(ii).

7. The method of claim 6 further comprising a step (c) of:
(c) when the first function is completed with respect to the $n+1^{st}$ data element, the second function is completed with respect to the n+2nd data element and the third function is completed with respect to the $n+3^{rd}$ data element, executing a third stage comprising:
  (i) performing the first decoding function on the $n+2^{nd}$ data element; and
  (ii) simultaneously performing the second decoding function on the $n+3^{rd}$ element in the data stream; and
  (iii) simultaneously performing the third decoding function on an $n+4^{th}$ element in the data stream.

8. The method of claim 1 further comprising a step (c) of:
(c) when the first function is completed with respect to the $n+1^{st}$ data element and the second function is completed with respect to the $n+2^{nd}$ data element, executing a third stage comprising:
  (i) performing the first decoding function on the $n+2^{nd}$ data element; and
  (ii) simultaneously performing the second decoding function on an $n+3^{rd}$ element in the data stream.

9. The method of claim 1 wherein the first stage further comprises a step (iii) of simultaneously performing a third decoding function on one of the $n^{th}$ and the $n+1^{st}$ data elements, and wherein the second stage is not executed until the first function is completed with respect to the $n^{th}$ data element, the second function is completed with respect to the $n+1^{st}$ data element and the third function is completed with respect to the one of the $n^{th}$ and $n+1^{st}$ data elements.

10. The method of claim 1 wherein the encoded digital data stream is a media data stream.

11. The method of claim 10 wherein the media data stream is a video data stream.

12. The method of claim 11 wherein the data elements represent macroblocks of a digital video image.

13. A method of decoding a digital video data stream, comprising:
(a) in a first stage, performing variable-length decoding on an $n^{th}$ data element of the data stream; and
(b) in a second stage, performing inverse quantization on a product of the variable-length decoding of the $n^{th}$ data element, while performing variable-length decoding on an $n+1^{st}$ data element in the data stream, wherein the second stage begins when the variable-length decoding of the first stage is completed.

14. The method of claim 13 further comprising:
(c) in a third stage, performing an inverse transform operation on a product of the inverse quantization of the $n^{th}$ data element while performing inverse quantization on a product of the variable-length decoding of the $n+1^{st}$ data element and performing variable-length decoding on an $n+2^{nd}$ data element in the data stream, wherein the third stage begins when the last of the variable-length decoding and the inverse quantization of the second stage is completed.

15. The method of claim 14 wherein performing step (c) further comprises: in the third stage, performing pixel filtering on the $n^{th}$ data element while performing the inverse transform operation on the product of the inverse quantization of the $n^{th}$ data element.

16. The method of claim 15 further comprising:
(d) in a fourth stage, performing motion compensation on the $n^{th}$ data element using a product of the inverse transform operation performed on the $n^{th}$ data element and a product of the pixel filtering performed on the $n^{th}$ data element, while performing an inverse transform operation on a product of the inverse quantization of the $n+1^{st}$ data element, performing inverse quantization on a product of the variable-length decoding of the $n+2^{nd}$ data element, and performing variable-length decoding on an $n+3^{rd}$ data element in the data stream, wherein the fourth stage begins when the last of the variable-length decoding, the inverse quantization and the inverse transform operation of the third stage is completed.

17. The method of 16 further comprising:
(e) iteratively repeating performing step (d), incrementing n with each iteration, as long as the data stream contains further data elements to be decoded.

18. The method of claim 13 wherein the data elements represent macroblocks of a digital video image.

19. A method of decoding an encoded digital data stream, comprising:
(a) in a first stage, initiating performance of a first decoding function on a first data element by a first decoding element;
(b) in a second stage, initiating performance of the first decoding function on a second data element by a second decoding element; and
(c) in a third stage, performing a second decoding function on the first data element and initiating performance of the first decoding function on a third data element by the first decoding element.

20. The method of claim 19 wherein step (b) further comprises completing performance of the first decoding function on the first data element by the first decoding element during the second stage.

21. The method of claim 20 wherein step (c) further comprises completing performance of the first decoding function on the second data element by the second decoding element during the third stage.

22. The method of claim 19 further comprising:
(d) in each of a plurality of subsequent sequential stages, initiating performance of the first decoding function on a next data element to be decoded and performing the second decoding function on the data element on which the first decoding function was initiated two stages prior, wherein the first decoding function in each successive stage is performed alternately by the first and second decoding elements.

23. The method of claim 22 wherein each successive stage begins when the second decoding function from the previous stage is completed.

24. The method of claim 22 wherein the first data element is a first macroblock of a first row of a video frame, the second data element is a first macroblock of a second row of the video frame and the third data element is a second macroblock of the first row of the video frame, and wherein the first decoding function in each subsequent stage is performed alternately on subsequent macroblocks of the first and second rows of the video frame, the first decoding element performing the first decoding function on the macroblocks of the first row and the second decoding element performing the first decoding function on the macroblocks of the second row.

25. The method of claim 19 farther comprising:
(d) in a fourth stage, performing the second decoding function on the second data element and initiating performance of the first decoding function on a fourth data element by the second decoding element.

26. The method of claim 25 wherein the fourth stage begins when the second decoding function is completed with respect to the first data element.

27. The method of claim 26 wherein step (d) further comprises performing a third decoding function on the first data element while performing the second decoding function on the second data element.

28. The method of claim 27 further comprising:
(e) in each of a plurality of subsequent sequential stages, initiating performance of the first decoding function on a next data element to be decoded, performing the second decoding function on the data element on which the first decoding function was initiated two stages prior and performing the third decoding function on the data element that was operated on by the second decoding function in the prior stage, wherein the first decoding function in each successive stage is performed alternately by the first and second decoding elements.

29. The method of claim 28 wherein each successive stage begins when the second and third decoding functions from the previous stage are completed.

30. The method of claim 27 further comprising:
(e) in a fifth stage, performing the second decoding function on the third data element while performing the third decoding function on the second data element, and initiating performance of the first decoding function on a fifth data element by the second decoding element.

31. The method of claim 30 wherein the fifth stage begins when the second decoding function is completed with respect to the second data element and the third decoding function is completed with respect to the first data element.

32. The method of claim 30 wherein step (d) further comprises performing a fourth decoding function on the first data element while performing the third decoding function on the second data element and the second decoding function on the third data element.

33. The method of claim 19 wherein the second decoding function for a given data element is dependent upon a result of the first decoding function for the given data element.

34. The method of claim 33 wherein the second decoding function for a given data element is performed on a result of the first decoding function for the given data element.

35. The method of claim 19 wherein performing a decoding function on a data element according to steps (a), (b) and (c) comprises performing a decoding function on a processed version of the associated data element.

36. The method of claim 19 wherein the encoded digital data stream is a media data stream.

37. The method of claim 36 wherein the media data stream is a video data stream.

38. The method of claim 37 wherein the data elements represent macroblocks of a digital video image.

39. The method of claim 38 wherein the first data element is a first macroblock of a first row of a video frame, the second data element is a first macroblock of a second row of the video frame and the third data element is a second macroblock of the first row of the video frame.

40. A method of decoding an encoded digital video data stream, comprising:
(a) in a first stage, initiating variable-length decoding on a first macroblock with a first variable-length decoder;
(b) in a second stage, initiating variable-length decoding on a second macroblock with a second variable-length decoder; and
(c) in a third stage, performing inverse quantization on the first macroblock and initiating variable-length decoding on a third macroblock with the first variable-length decoder.

41. The method of claim 40 wherein step (b) further comprises completing the variable-length decoding of the first macroblock with the first variable-length decoder during the second stage.

42. The method of claim 41 wherein step (c) further comprises completing the variable-length decoding of the second macroblock with the second variable-length decoder during the third stage.

43. The method of claim 40 further comprising:
(d) in each of a plurality of subsequent sequential stages, initiating variable-length decoding on a next macroblock to be decoded and performing inverse quantization on the macroblock on which variable-length decoding was initiated two stages prior, wherein the variable-length decoding in each successive stage is performed alternately by the first and second variable-length decoders.

44. The method of claim 43 wherein each successive stage begins when the inverse quantization from the previous stage is completed.

45. The method of claim 43 wherein the first macroblock is a first macroblock of a first row of a video frame, the second macroblock is a first macroblock of a second row of the video frame and the third macroblock is a second macroblock of the first row of the video frame, and wherein the variable-length decoding in each subsequent stage is performed alternately on subsequent macroblocks of the first and second rows of the video frame, the first variable-length decoder performing the variable-length decoding of the macroblocks of the first row and the second variable-length decoder performing the variable-length decoding of the macroblocks of the second row.

46. The method of claim 40 further comprising:
(d) in a fourth stage, performing inverse quantization on the second macroblock and initiating variable-length decoding on a fourth macroblock with the second variable-length decoder.

47. The method of claim 46 wherein the fourth stage begins when the inverse quantization is completed with respect to the first macroblock.

48. The method of claim 47 wherein step (d) further comprises performing an inverse transform operation on the first macroblock while performing the inverse quantization on the second macroblock.

49. The method of claim 48 further comprising:
(e) in each of a plurality of subsequent sequential stages, initiating variable-length decoding on a next macroblock to be decoded, performing inverse quantization on the macroblock on which variable-length decoding was initiated two stages prior and performing an inverse transform operation on the macroblock that was inverse quantized in the prior stage, wherein variable-length decoding in each successive stage is performed alternately by the first and second variable-length decoders.

50. The method of claim 49 wherein each successive stage begins when the inverse quantization and inverse transform operations from the previous stage are completed.

51. The method of claim 48 further comprising:
(e) in a fifth stage, performing inverse quantization on the third macroblock while performing an inverse transform operation on the second macroblock, and initiating variable-length decoding on a fifth macroblock with the second variable-length decoder.

52. The method of claim 51 wherein the fifth stage begins when both the inverse quantization of the second macroblock and the inverse transform operation performed on the first macroblock are completed.

53. The method of claim 51 wherein step (d) further comprises performing motion compensation on the first macroblock while performing an inverse transform operation on the second macroblock and inverse quantization on the third macroblock.

54. The method of claim 40 wherein the inverse quantization for a given macroblock is performed on a result of the variable-length decoding for the given macroblock.

55. The method of claim 40 wherein the first macroblock is a first macroblock of a first row of a video frame, the second macroblock is a first macroblock of a second row of the video frame and the third macroblock is a second macroblock of the first row of the video frame.

56. A method of decoding data elements in a bitstream comprising:
  (a) initiating a plurality of external decoding functions, each of the plurality of decoding functions operating on a respective one of a sequence of data elements in the bitstream;
  (b) waiting an undefined time period until each of the plurality of external decoding functions has been completed;
  (c) initiating the plurality of extended decoding functions, each of the plurality of decoding functions operating on a respective one of a next sequence of data elements in the bitstream; and
  (d) repeating steps (b) and (c) for a plurality of different sequences of data elements in the bitstream.

57. The method of claim 56 wherein waiting step (b) comprises waiting a time period corresponding to a slowest one of the plurality of external decoding functions.

58. The method of claim 56 wherein the next sequence of data elements comprises a prior sequence of data elements minus a first data element of the prior sequence plus a next data element in the bitstream.

59. The method of claim 56 wherein the slowest one of the plurality of external decoding functions comprises any one of the plurality of decoding functions.

60. A method of decoding a digital media data stream, comprising:
  (a) in a first stage, performing a first decoding function on an $n^{th}$ data element of the data stream with a first decoding accelerator; and
  (b) in a second stage, after the first stage, performing a second decoding function on the $n^{th}$ data element with a second decoding accelerator, while performing the first decoding function on an $n+1^{st}$ data element in the data stream with the first decoding accelerator.

61. The method of claim 60 wherein the second decoding function for a given data element is dependent upon a result of the first decoding function for the given data element.

62. The method of claim 60 further comprising:
  (c) in a third stage, after the second stage, performing a third decoding function on the $n^{th}$ data element with a third decoding accelerator, while performing the second decoding function on the $n+1^{st}$ data element with the second decoding accelerator and performing the first decoding function on an $n+2^{nd}$ data element in the data stream with the first decoding accelerator.

63. The method of claim 62 wherein the second decoding function for a given data element is dependent upon a result of the first decoding function for the given data element, and wherein the third decoding function for a given data element is dependent upon a result of the second decoding function for the given data element.

64. The method of claim 60 wherein step (a) comprises: in the first stage, performing a third decoding function on the $n^{th}$ data element of the data stream with a third decoding accelerator while performing the first decoding function on the $n^{th}$ data element with the first decoding accelerator, and wherein step (b) comprises: in the second stage, performing the second decoding function on the $n^{th}$ data element with a second decoding accelerator, while performing the first and third decoding functions on an $n+1^{st}$ data element in the data stream with the first and third decoding accelerators, respectively.

65. The method of claim 64 wherein the second decoding function for a given data element is dependent upon a result of both the first decoding function and the third decoding function for the given data element.

66. The method of claim 64 wherein the data stream is a video data stream and wherein the first decoding function comprises an inverse discrete cosine transform operation, the second decoding function comprises a motion compensation operation, and the third decoding operation comprises a pixel filtering operation.

67. The method of claim 60 wherein the data stream is a video data stream.

68. The method of claim 67 wherein the data elements represent macroblocks of a digital video image.

* * * * *